(12) United States Patent
Schrooten et al.

(10) Patent No.: US 8,129,065 B2
(45) Date of Patent: Mar. 6, 2012

(54) ELECTROCHEMICAL CELL ASSEMBLIES INCLUDING A REGION OF DISCONTINUITY

(75) Inventors: Jeremy Schrooten, Mission (CA); Paul Sobejko, North Vancouver (CA)

(73) Assignee: Société BIC, Clichy (FR)

( * ) Notice: Subject to any disclaimer, the term of this patent is extended or adjusted under 35 U.S.C. 154(b) by 664 days.

(21) Appl. No.: 12/341,294

(22) Filed: Dec. 22, 2008

(65) Prior Publication Data

US 2009/0162722 A1    Jun. 25, 2009

Related U.S. Application Data

(60) Provisional application No. 61/021,581, filed on Jan. 16, 2008, provisional application No. 61/016,308, filed on Dec. 21, 2007.

(51) Int. Cl.
*H01M 8/10* (2006.01)

(52) U.S. Cl. .......................................... 429/453; 429/508

(58) Field of Classification Search .......... 429/129–130, 429/142–144, 146, 148, 247, 160, 304, 453, 429/465, 492, 479, 480, 508
See application file for complete search history.

(56) References Cited

U.S. PATENT DOCUMENTS

| | | |
|---|---|---|
| 5,190,834 A | 3/1993 | Kendall |
| 5,783,324 A | 7/1998 | Binder et al. |
| 5,861,221 A | 1/1999 | Ledjeff et al. |
| 5,863,672 A | 1/1999 | Ledjeff et al. |
| 5,925,477 A | 7/1999 | Ledjeff et al. |
| 5,952,118 A | 9/1999 | Ledjeff et al. |
| 5,989,741 A | 11/1999 | Bloomfield et al. |
| 6,127,058 A | 10/2000 | Pratt et al. |
| 6,680,139 B2 | 1/2004 | Narayanan et al. |
| 7,132,192 B2 | 11/2006 | Muthuswamy et al. |
| 7,153,601 B2 | 12/2006 | Mardilovich et al. |
| 7,229,564 B2 | 6/2007 | Liu et al. |
| 7,314,677 B2 | 1/2008 | Mosdale |
| 7,323,266 B2 | 1/2008 | Morishima et al. |
| 7,632,587 B2 * | 12/2009 | McLean et al. ............. 429/453 |
| 2003/0082425 A1 * | 5/2003 | Leban ........................ 429/32 |
| 2005/0249994 A1 | 11/2005 | McLean et al. |
| 2005/0250004 A1 | 11/2005 | McLean et al. |
| 2007/0090786 A1 | 4/2007 | McLean |
| 2007/0134531 A1 | 6/2007 | Kimura et al. |
| 2008/0206619 A1 | 8/2008 | Imura et al. |
| 2008/0233454 A1 * | 9/2008 | Capron et al. .............. 429/33 |
| 2008/0261088 A1 | 10/2008 | Cha et al. |
| 2008/0299435 A1 | 12/2008 | Imura et al. |
| 2009/0081493 A1 | 3/2009 | Schrooten et al. |
| 2009/0081523 A1 | 3/2009 | Stukas et al. |
| 2009/0095409 A1 | 4/2009 | Schrooten et al. |
| 2011/0003229 A1 * | 1/2011 | Schrooten et al. ........... 429/457 |

FOREIGN PATENT DOCUMENTS

JP    2005-093274 A    4/2005

OTHER PUBLICATIONS

Schrooten, J., et al., "Electrochemical Cell Assemblies Including a Region of Discontinuity", U.S. Appl. No. 61/021,581, filed Jan. 16, 2008, 32 pgs.

* cited by examiner

*Primary Examiner* — Helene Klemanski
(74) *Attorney, Agent, or Firm* — Schwegman, Lundberg & Woessner, P.A.

(57) ABSTRACT

Embodiments of the invention relate to electrochemical cell assemblies in which a region of discontinuity provides separation and insulation between adjacent cells in an array.

34 Claims, 4 Drawing Sheets

Fig. 11

ELECTROCHEMICAL CELL ASSEMBLIES INCLUDING A REGION OF DISCONTINUITY

PRIORITY OF INVENTION

This application claims the benefit of priority to U.S. Provisional Patent Application Ser. Nos. 61/016,308 and 61/021,581, filed Dec. 21, 2007 and Jan. 16, 2008 respectively, which are herein incorporated by reference.

BACKGROUND

Electrochemical cells, such as fuel cells, include pathways for the transport of charged species. Ions from electrochemical reactions are transported through an ion-exchange membrane of a fuel cell, such as a proton exchange membrane, and electrons are transferred between adjacent fuel cells. Specifically, a path for proton conductivity can be integrated within the fuel cell while a path for electron conductivity is created between adjacent fuel cells to provide an electrical circuit from the overall positive and negative electrical connections of the fuel cell device. Bipolar fuel cells are arranged to provide an electrical current flow in a direction opposite to an ion flow through the membrane. Alternately, edge-collected fuel cells provide electrical current flow parallel to the membrane while ion flow occurs through the membrane.

In either case, edge collected or bipolar, the electrolyte serves as both a proton conductor and an electrical insulator, i.e. the electrolyte separates the two reaction electrodes and prevents the short circuit of electrical current between the two. However, one function of the electrical insulation is to prevent the electrical short circuit of the two electrodes of a unit fuel cell with each other.

An alternative class of fuel cell architecture is emerging for use in micro fuel cell applications that results in a thin layered fuel cell structure with neighboring fuel cells arranged adjacent each other, such as in an array. When a fuel cell layer of this variety incorporates more than one fuel cell, some form of electrically insulating material must exist in the same plane as the electrodes to prevent electrical short circuiting between neighboring cells. The planar fuel cell array includes multiple fuel cells which have like electrodes arranged next to each other on the same face of the fuel cell layer. A requirement is to prevent the electrical short circuit of adjacent like electrodes, such as by adding insulating materials that detract from the overall active area of the array. Current designs allocate significant portions of space to insulating materials that do not contribute to energy conversion. Further, the addition of an explicit insulating material adds both cost and complexity to the fuel cell design.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Embodiments of the present invention relate to a coated electrolyte composite for a plurality of electrochemical cells in an array. The coated electrolyte includes a composite layer having a dielectric component and an electrically conductive component and two or more conductive regions disposed on a surface of the composite layer. The conductive regions include a coating having one or more electrochemical reaction areas, one or more current collecting areas or a combination thereof. The electrically conductive component is in contact with the coating and the adjacent conductive regions are positioned to provide a discontinuity region.

Embodiments of the present invention relate to core assembly for an electrochemical cell. The core assembly includes two or more electrode assemblies, each assembly including one or more electrodes, one or more cell interconnects and a dielectric material in contact with the one or more electrodes and the one or more cell interconnects. At least two like electrodes from adjacent electrode assemblies are positioned in a substantially planar array and positioned to provide an insular break between the two or more electrode assemblies.

Embodiments of the present invention also relate to an electrochemical cell assembly including two or more electrochemical cells positioned in an array. Each cell includes an anode electrode, a cathode electrode, an ion-exchange layer positioned between the anode electrode and cathode electrode, a cell interconnect in contact with the anode electrode of a first electrochemical cell and the cathode of a second electrochemical cell, in which the first and second electrochemical cells are adjacently positioned in an array. Like electrodes of adjacently positioned electrochemical cells are positioned to provide a discontinuity between the adjacent cells and wherein the like electrodes of adjacent cells are substantially in the same plane.

Embodiments of the present invention relate to a core assembly for an electrochemical cell including two or more electrode assemblies. Each assembly includes one or more electrodes, a cell interconnect coupled to one of the electrodes and a dielectric material in contact with the one or more electrodes and one or more cell interconnects. At least two like electrodes from adjacent electrode assemblies are positioned in a substantially planar array and positioned to provide an insular break between the two or more electrode assemblies.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the present invention relate to electrochemical cells such as fuel cells electrolyzers, and batteries, and may also have application in other types of electrochemical cells, such as those used for chlor-alkali processing. Some embodiments of the invention provide electrochemical cell layers comprising arrays of individual or "unit" cells. Arrays may be substantially planar or cylindrical, for example.

Any suitable type of fuel cell and appropriate materials can be used according to the present invention including without limitation proton exchange membrane fuel cells (PEMFCs), solid oxide fuel cells (SOFCs), molten carbonate fuel cell (MCFCs), alkaline fuel cells, other suitable fuel cells, and materials thereof. The electrolyte may comprise, for example, a proton exchange membrane. Alternately, the electrolyte may comprise a thin-film solid oxide electrolyte. Certain embodiments of the invention permit construction of an electrochemical cell layer comprising a plurality of individual unit cells formed on the electrolyte.

An electrochemical cell layer including a plurality of unit cells may be constructed by providing a substrate including a plurality of ion conducting regions. Such a substrate could be provided, for example by selectively treating a sheet of non- or partially-conducting material to form the ion conducting regions, or by selectively treating a sheet of ion conducting material to form non-conducting regions, as described, for example in the commonly-assigned application Pub. No. 2005/0249994, entitled "MEMBRANES AND ELECTROCHEMICAL CELLS INCORPORATING SUCH MEMBRANES", the disclosure of which is herein incorporated by reference. Unit cells according to the invention may be used in a planar electrochemical cell layer that is conformable to other geometries, as described in application Pub. No. 2007/0090786, entitled "DEVICES POWERED BY CONFORMABLE FUEL CELLS" and application Ser. No. 12/238,241, filed 25 Sep. 2008, entitled "FUEL CELL SYSTEMS INCLUDING SPACE-SAVING FLUID PLENUM AND RELATED METHODS," which are hereby incorporated by reference.

Arrays of unit cells can be constructed to provide varied-power generating electrochemical cell layers in which the entire electrochemical structure is contained within the layer. This means additional components such as plates for collecting currents etc. can be eliminated, or replaced with structures serving different functions. Structures like those described herein are well adapted to be manufactured by continuous processes. Such structures can be designed in a way which does not require the mechanical assembly of individual parts. In some embodiments, the conductive path lengths within this structure may be kept extremely short so that ohmic losses in the catalyst layer are minimized.

Array may refer to a plurality of individual unit cells. The plurality of cells may be formed on a sheet of ion exchange membrane material, a substrate, or may be formed by assembling a number of components in a particular manner. Arrays can be formed to any suitable geometry. Examples of planar arrays of fuel cells are described in co-owned U.S. application publication number 2005/0250004 entitled "ELECTROCHEMICAL CELLS HAVING CURRENT CARRYING STRUCTURES UNDERLYING ELECTROCHEMICAL REACTION LAYERS", the disclosure of which is herein incorporated by reference. Fuel cells in an array can also follow other planar surfaces, such as tubes as found in cylindrical fuel cells. Alternately or in addition, the array can include flexible materials that can be conformed to other geometries.

Embodiments of the invention relate to a core assembly of an electrochemical cell, an electrochemical cell assembly and a coated electrolyte composite. In embodiments of the present invention, a precisely defined insular region or discontinuity region between conductive regions of adjacent electrochemical cells in the array provides a discontinuity in conductivity, thereby eliminating the need for any explicit insulating material. One goal in manufacturing micro fuel cells is to provide the largest possible active area relative to a given overall footprint. Therefore, the space occupied between neighboring cells is critical. For example, if the space between cells required to prevent electrical short circuit is as wide as the cells themselves, then only 50% of the projected footprint of the cells can be made active in an electrochemical reaction sense. However, reducing the width of this insulating zone presents challenges.

In some structures an insulating material is placed between adjacent cells in the same plane as the electrodes. This insulation serves to separate electrodes and prevent short circuiting. However, the addition of an explicit insulating material adds both cost and complexity to the fuel cell design.

Embodiments of the present invention relate to the use of a precisely defined air gap or region of discontinuity on a composite layer, such as an electrolyte, in the plane of the electrodes to create an insulating barrier between adjacent fuel cells in a planar fuel cell array. By carefully aligning the electrode layers relative to each other and leaving a narrow but defined gap, no electrical short circuit is created between layers and no third material is required.

Definitions

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Further examples of fuel cells include proton exchange membrane fuel cells, direct methanol fuel cells, alkaline fuel cells, phosphoric acid fuel cells, molten carbonate fuel cells or solid oxide fuel cells.

As used herein, "dielectric material" refers to a substance exhibiting negligible electrical conductivity. Dielectric materials may be understood to include ion-conducting materials, non-ion-conducting materials, and combinations thereof. Examples of ion-conducting materials include any ionomer or electrolyte suitable to the application, such as ion-exchange polymers, alkaline solutions, phosphoric acid, alkali carbonates, and oxide ion-conducting ceramics. Examples of non-ion-conducting materials include polymers, such as polypropylene, polyethylene, polycarbonate, poly ethylene ether ketones, polyimides, polyamides, fluoropolymers and other polymer films. An example of a polyimide includes Kapton™ film. An example of a fluoropolymer is PTFE (polytetrafluoroethylene) or Teflon™ film. Other fluoropolymers include PFSA (perfluorosulfonic acid), FEP (fluorinated ethylene propylene) and PFA (perfluoroalkoxyethylene). Dielectric materials may also include reinforced composite materials such as fiberglass, any suitable non polymer materials such as silicon or glass, and combinations thereof. The dielectric material may include an electrolyte, for example. The electrolyte may be a solid electrolyte membrane.

As used herein, "composite layer" refers to a layer having at least two surfaces having a thickness, where one or more ion-conducting passageways are defined between the surfaces and where one or more electrically conducting passageways are defined between the surfaces. Ion-conducting properties and electrically conducting properties of the composite layer can be varied in different regions of the composite layer by defining ion-conducting passageways and electrically conducting passageways with varying sizes, shapes, densities and/or arrangements. The composite layer described herein is capable of providing desired electrical conductivity, ionic conductivity, gas permeability, and mechanical strength characteristics that can be varied at the designer's discretion over the spatial extent of the composite layer. This affords greater design flexibility and allows the local tuning of mechanical and electrical parameters to best meet the competing needs of ion conductivity and mechanical strength within a fuel cell or similar system. As examples, the composite layer may include one or more electrically conductive components such as cell interconnects for providing desired electrical conductivity, ionically conductive components such as electrolytes for providing desired ionic conductivity, and other non-ionically conductive dielectric components (as described below) for reducing gas permeability and/or mechanical strength.

As used herein, "dielectric component" refers to a component of the composite layer including one or more dielectric materials. The dielectric component of the composite membrane can include ion-conducting passageways, a dielectric protective layer, a dielectric skin, a dielectric support structure (as described below) or some combination thereof. The dielectric component may include a proton exchange membrane component or a thin-film oxide electrolyte, for example.

As used herein, a "conductive region" refers to an area of the composite layer which is electrically conductive. A conductive region may be an area of the surface of the composite layer and may also include aspects disposed on or integral to the composite layer. A conductive region may further include aspects of the composite layer. For example, the conductive region may include exposed surfaces of the cell interconnects underlying the coating, a conductive gas diffusion layer, other suitable conductive members, or some combination thereof and may be manufactured from metals that are noble or are metals coated with a corrosion resistant layer, such as PEMCoat™ from INEOS Chlor™ Americas Inc., Wilmington, Del. or from conductive non-metals such as carbon, graphite, carbon fibers, carbon nanotubes, electrically conductive ceramics, or electrically conductive polymers. In addition, the conductive region may also be ionically conductive.

As used herein, "discontinuity region" or "insular break" may refer to an area on the surface of the composite layer that provides electrical separation between conductive regions.

As used herein, "coating" refers to a conductive thin-layer disposed on the surface of a composite layer. For example, the coating may be a catalyst layer or electrodes, such as anodes and cathodes.

As used herein, "catalyst" refers to a material or substance that assists in starting or increasing the rate of a reaction, without being modified or consumed itself. Catalyst layers may comprise any type of electrocatalyst suitable for the application at hand. Catalysts or catalyst layers may include pure platinum, carbon-supported platinum, platinum black, platinum-ruthenium, palladium, copper, tin oxide, nickel, gold, and mixtures of carbon black, or combinations thereof. Catalyst layers may further include a binder, such as one or more of PFSA (perfluorosulfonic acid), PTFE (polytetrafluoroethylene) powder, PVDF (polyvinylidene difluoride) powder (e.g., Kynar™) and silicon dioxide powder, or combinations thereof, for example. The carbon black may include any suitable finely divided carbon material such as one or more of acetylene black carbon, carbon fibers, carbon needles, carbon nanotubes, and carbon nanoparticles.

As used herein, "gas diffusion layers" may refer to a porous conductive or dielectric member. The gas diffusion layer may be disposed on the coating or may be integrated in the coating. Gas diffusion layers may allow passage of gases through to a catalyst layer. Gas diffusion layers may be manufactured of carbon cloth or carbon fiber paper, for example. The gas diffusion layer may be an adaptive material or other form of adaptable fuel cell cover, such as described in commonly owned U.S. patent application Ser. No. 12/238,040, entitled "FUEL CELL COVER", filed Sep. 25, 2008, the disclosure of which is herein incorporated by reference in its entirety, and further as described in U.S. Pat. No. 7,132,192, entitled "FUEL CELL USING VARIABLE POROSITY GAS DIFFUSION MATERIAL", the disclosure of which is herein incorporated by reference in its entirety.

As used here, "electrochemical reaction area" refers to an area of the coating disposed on the dielectric component of the composite layer. All or part of an electrochemical reaction may occur within the electrochemical reaction area. The electrochemical reaction area may include a catalyst or catalyst layer.

As used here, "current collecting area" refers to an area of the coating in contact with an electrically conductive component of the composite layer.

As used herein, "cell interconnect" refers to an electrically conducting member that electrically communicates electrodes of two or more fuel cell units. The cell interconnect may include any one of the electrically conducting passageways of the composite layer and/or a terminal current collector for communicating the array with an external circuit.

As used herein, "electrode regions" or "electrodes" refer to materials or components that act as anodes, cathodes or both in an electrochemical reaction. The electrode region or electrode may be part of the conductive region or a composite layer, a coating or both. Electrodes may include a catalyst layer, a gas diffusion layer, or both.

Figure 1A:
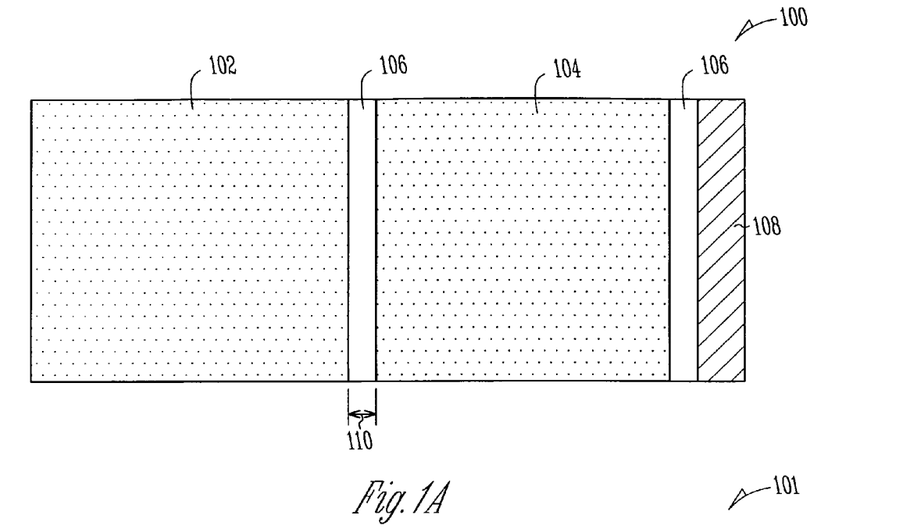
FIG. 1A illustrates a top view of a core assembly for an electrochemical cell, according to some embodiments.

Referring to FIG. 1A, a top view 100 of a core assembly for an electrochemical cell is shown, according to some embodiments. The core assembly may include conductive regions 102, 104 providing a path of electrical conductivity along the surface of the core assembly. The conductive regions 102, 104 may include multiple aspects of the core assembly. A first conductive region 102 may be separated by a discontinuity region 106 from a second conductive region 104.

Figure 1B:
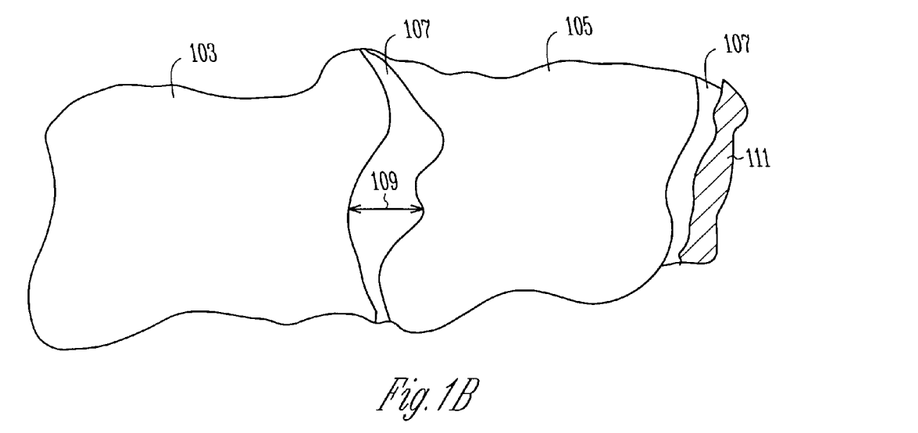
FIG. 1B illustrates a top view of a core assembly for an electrochemical cell including non-uniform borders, according to some embodiments.

In some embodiments, the conductive regions 102, 104 may include multiple aspects of the core assembly, such as conductive coatings along the surface of the core assembly and/or aspects providing electrical conductivity through the plane of the core assembly. Top view 100 shows a cell interconnect 108 exposed on the surface of the core assembly. The second conductive region 104 may be separated from a cell interconnect 108 by another discontinuity region 106 of width 110. The core assembly of FIG. 1B is shown from a top view 101 in which the first and second conductive regions 103, 105 are separated by a discontinuity region 107 with width 109. A cell interconnect 111 exposed on the surface of the core assembly may be separated from the second conductive region 105 by a discontinuity region 107. In contrast to FIG. 1A, the borders or boundaries of each component in FIG. 1B may be non-uniform or non-linear, for example. As examples, width 110 may be less than 1 mm, less than 0.1 mm, or less than 0.025 mm. Width 109 in FIG. 1B may vary substantially from one part of the assembly to another.

Figure 2:
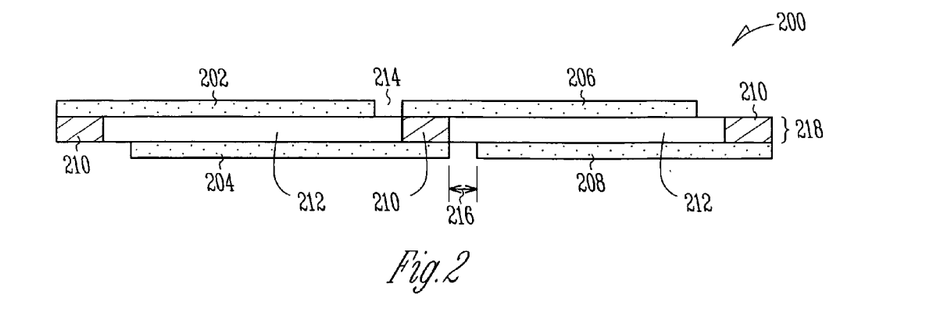
FIG. 2 illustrates a cross-section of a core assembly for an electrochemical cell, according to some embodiments.

Referring to FIG. 2, a cross-section view 200 of a core assembly for an electrochemical cell is shown, according to some embodiments. Coatings 202, 204, 206, 208 may be in contact with a composite layer 218. In some embodiments, the coatings are conductive. A region of discontinuity 214 may separate and electrically insulate adjacent conductive coatings 202, 206 and 204, 208 along the surface of each side of the composite layer 218. The discontinuity region 214 has a width 216. In this embodiment, the region of discontinuity 214 exists between conductive coatings 202, 206 in contact with composite layer 218.

The composite layer 218 may include electrically conductive portions and dielectric portions. In some embodiments, the electrically conductive portions may include one or more cell interconnects 210, and the dielectric portions may include an electrolyte 212. The electrolyte may contact or cover a portion of at least one of the one or more cell interconnects 210, for example.

By having a substantial overlap or contact between the coatings 202, 206 and cell interconnects 210, a more effective transfer of an electric current from the electrochemical reaction sites to the cell interconnect results. However, to prevent shorting of adjacent fuel cell units, adjacent coatings may be arranged such that electrical communication through a cell interconnect may be mitigated. The ability of a manufacturing process to produce such a narrow discontinuity 214 influences the performance considerably. However, this and other embodiments allow there to be some imprecision in manufacturing and still obtain a working cell, although possibly with a differing performance than the embodiment shown in FIG. 2. Suitable methods for the expedited creation of a defined and evenly distributed layered region are described in co-owned U.S. application Ser. No. 12/242,231, filed 30 Sep. 2008 entitled "METHODS OF MANUFACTURING ELECTROCHEMICAL CELLS", the disclosure of which is herein incorporated by reference.

Figure 3:
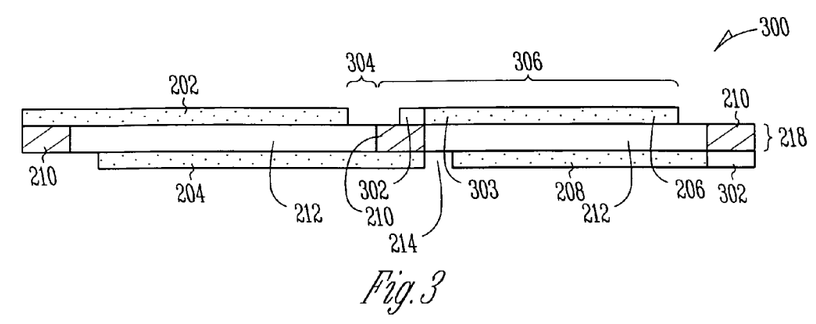
FIG. 3 illustrates a cross-section of a core assembly for an electrochemical cell including a discontinuity region in contact with a cell interconnect, according to some embodiments.

Referring to FIG. 3, a cross-section view 300 of a core assembly for an electrochemical cell, including a discontinuity region in contact with a cell interconnect, is shown, according to some embodiments. Coatings 202, 204, 206, 208 may be in contact with a composite layer 218. Each coating may include a discrete current collecting area 302 in contact with a cell interconnect and a discrete electrochemical reaction area 303 in contact with a dielectric portion 212 of the composite layer.

The coatings 202, 204, 206, 208 may be arranged such that some aspects of the composite layer 218, such as the cell interconnects 210, are exposed. As such, any coating may expose an underlying cell interconnect 210 such that a conductive region 306 may be formed by the coating 206 and the exposed cell interconnect 210. The one or more cell interconnects 210 may be a rectangular geometry or shape are be substantially perpendicular to the one or more conductive regions 306 or coatings 202, 204, 206, 208. The one or more cell interconnects 210 may be rectangular in one dimension and angled or circular in another, for example.

A single cell interconnect 210 may be in contact with a first conductive region and isolated from a second conductive region, the second conductive region positioned adjacent to the first. The one or more cell interconnects 210 may at least partially penetrate the surface of the composite layer 218. The cell interconnects 210 may be rectangular, circular, angled, or a combination thereof (e.g., such as by viewing the interconnect in different planes). The cell interconnect 210 may be a non-uniform shape. The cell interconnect 210 may comprises a rectangular geometry, which is substantially perpendicular to the one or more conductive regions.

The composite layer 218 may include a first surface and a second surface, the second surface opposite the first. The conductive regions 306 on opposite surfaces of the composite layer 218 may be aligned or off-set from one another.

Figure 4:
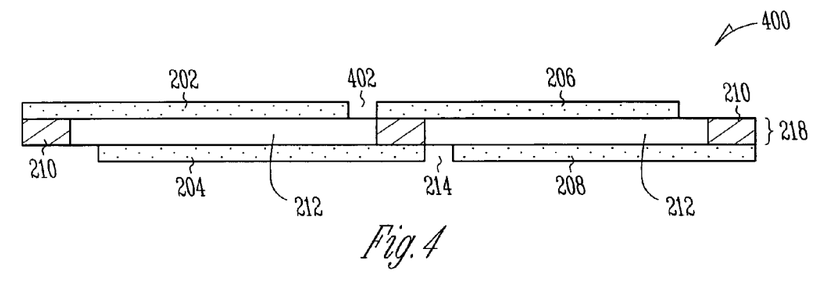
FIG. 4 illustrates a cross-section of a core assembly for an electrochemical cell including a discontinuity region in contact with a dielectric component, according to some embodiments.

A region of discontinuity 214 may separate a current carrying area from an electrochemical reaction area of adjacent coatings 204, 208. A region of discontinuity 304 may also separate a current carrying area or an electrochemical reaction area of a coating from a cell interconnect exposed by an adjacent coating. In FIG. 4, a discontinuity region 402 may be positioned away from the one or more cell interconnects 210, in which a dielectric portion 212 of the composite layer 218 is exposed. The region of discontinuity 214 may not contact or border the cell interconnect 210 and instead separate electrochemical reaction areas of adjacent coatings.

Figure 5:
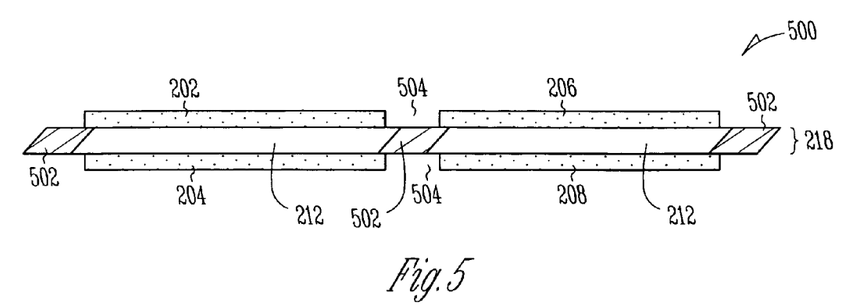
FIG. 5 illustrates a cross-section of an electrochemical cell assembly in which the cell interconnects are angled, according to some embodiments.

Referring to FIG. 5, a cross-section view 500 of an electrochemical cell assembly in which the cell interconnects are angled is shown, according to some embodiments. Coatings 202, 204, 206, 208 may be in contact with an electrolyte 212 (as part of the composite layer 218) and one or more cell interconnects 502. The cell interconnects 502 are angled in relation to the coatings 202, 204, 206, 208. Because the interconnects 502 are in contact with the coatings 202, 204, 206, 208 at an angle greater or less than about 90°, a region of discontinuity 504 may be formed that separates substantially aligned coatings 202, 204, 206, 208 without an electrical short. A single interconnect 502 may be in contact with a first coating and isolated from a second coating, the second coating positioned adjacent to the first.

Figure 6:
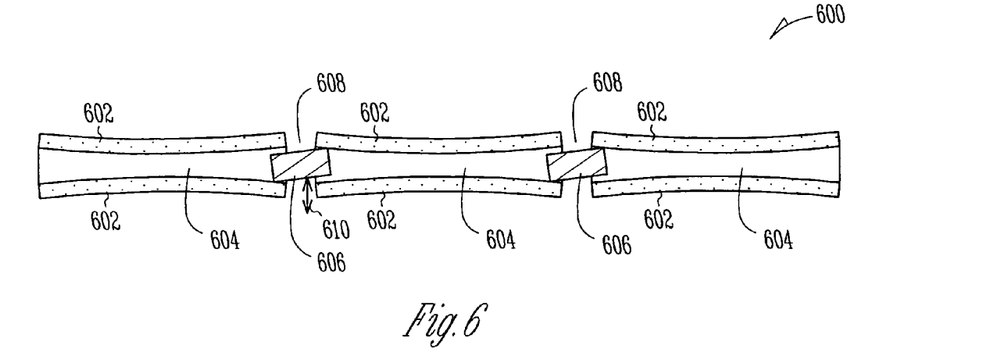
FIG. 6 illustrates a cross-section of an electrochemical cell assembly in which the conductive regions are aligned, according to some embodiments.

Referring to FIG. 6, a cross-section view 600 of an electrochemical cell assembly in which the conductive regions are aligned is shown, according to some embodiments. Conductive regions 602 may be in contact with a composite layer 604 and one or more cell interconnects 606. The cell interconnects 606 may be positioned to allow for aligned conductive regions 602 on opposite surfaces of a composite layer 604. A region of discontinuity 608 may provide insulation between adjacent regions 602. As shown in the figure, the region of discontinuity 608 may be orientated in a horizontal or vertical direction (see arrow 610, for example) or both, relative to the cell interconnect 606 or electrolyte 604. The region of discontinuity 608 may be positioned vertically between cell interconnect 606 and the conductive region 602 or horizontal between adjacent conductive regions 602, for example.

Figure 7:
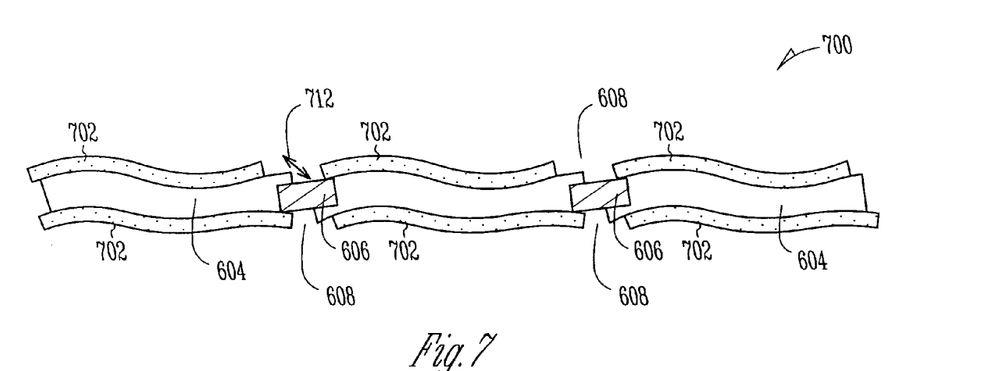
FIG. 7 illustrates a cross-section of an electrochemical cell assembly in which the conductive regions are offset, according to some embodiments.

Referring to FIG. 7, a cross-section view 700 of an electrochemical cell assembly in which the conductive regions are offset is shown, according to some embodiments. Conductive regions 702 may be in contact with an electrolyte 604 and one or more cell interconnects 606. The cell interconnects 606 may be positioned to allow for offset conductive regions 702 on opposite surfaces of an electrolyte 604. A region of discontinuity 608 may provide insulation between adjacent regions 702. As shown in the figure, the region of discontinuity 608 may be orientated in a parallel direction (FIGS. 3-5), an orthogonal direction (FIG. 6) or otherwise angled (see arrow 712, FIG. 7) relative to the cell interconnect 606 or electrolyte 604.

Figure 8:
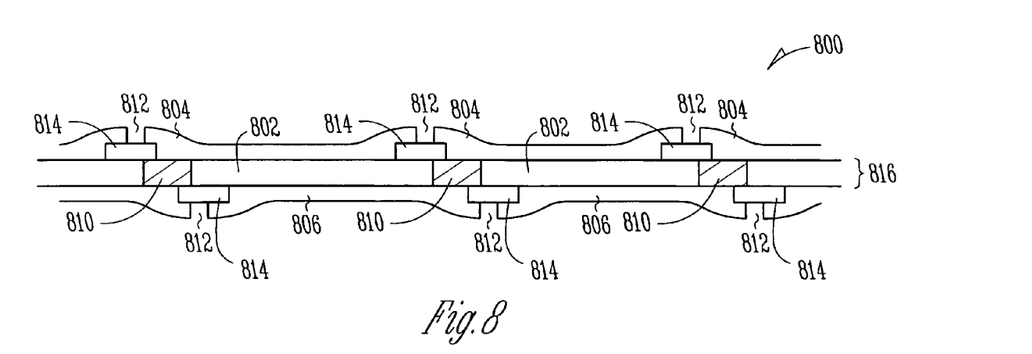
FIG. 8 illustrates a cross-section of a core assembly for an electrochemical cell including non-ion-conducting materials, according to some embodiments.

Referring to FIG. 8, a cross-section view 800 of a core assembly for an electrochemical cell including dielectric materials is shown, according to some embodiments. Conductive regions 804 and 806 may be in contact with an electrolyte 802 and one or more cell interconnects 810. One or more dielectric materials 814 may be in contact with one or more of the conductive regions 804, conductive regions 806, electrolyte 802 or cell interconnects 810. A discontinuity region 812 may be formed between adjacent conductive regions 804 or adjacent conductive regions 806, in which one or more of the dielectric materials 814 are exposed.

The dielectric materials 814 may be utilized for support or provide further cell functions. The dielectric material or component 814 may be partially disposed on a cell interconnect 810 and at least partially disposed on a dielectric component of the composite layer 816. The dielectric material 814 may be positioned to provide a discontinuity region between any adjacent conductive regions 804 or any adjacent conductive regions 806 along the non-conductive material.

Figure 9:
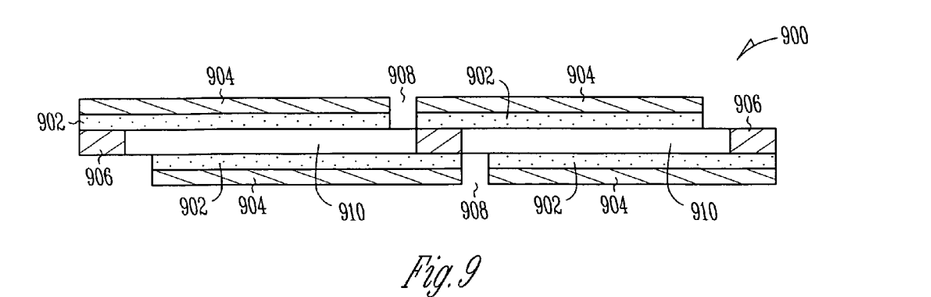
FIG. 9 illustrates a cross-section of a core assembly for an electrochemical cell including gas diffusion layers, according to some embodiments.
Figure 10:
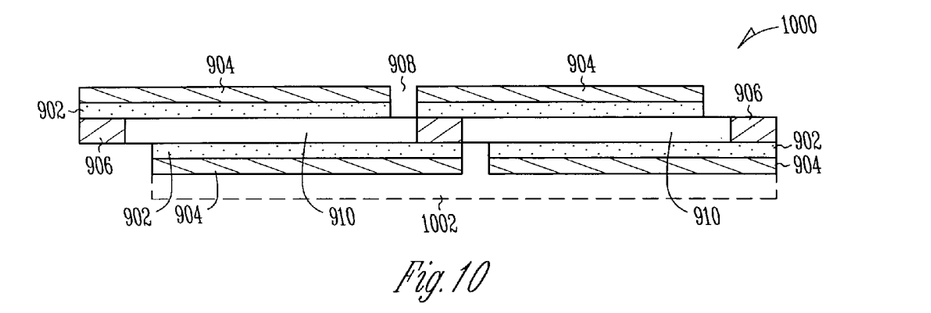
FIG. 10 illustrates a cross-section of a core assembly for an electrochemical cell including a fuel plenum, according to some embodiments.

Referring to FIG. 9, a cross-section view 900 of a core assembly for an electrochemical cell including gas diffusion layers is shown, according to some embodiments. Conductive regions 902 may be in contact with electrolyte 910 and one or more cell interconnects 906. On an opposite side as the electrolyte 910, the conductive regions 902 may contact a gas diffusion layer 904. A discontinuity region 908 may insulate and separate adjacent conductive regions 902. In FIG. 10, a fuel plenum 1002 may be in contact with one or more of the conductive regions 902, electrolyte 910, one or more of the gas diffusion layers 904, one or more of the cell interconnects 906, or a combination thereof.

Figure 11:
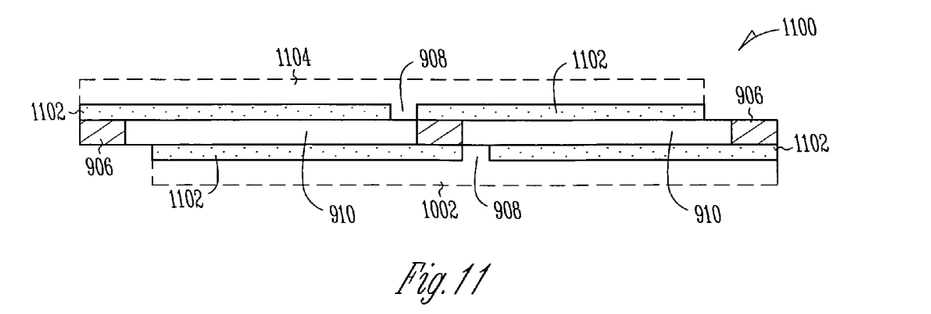
FIG. 11 illustrates a cross-section of a core assembly for an electrochemical cell including an oxidant plenum and fuel plenum, according to some embodiments.

Referring to FIG. 11, a cross-section view 1100 of a core assembly for an electrochemical cell including an oxidant plenum and fuel plenum is shown, according to some embodiments. Conductive regions 1102 may be in contact with electrolyte 910 and one or more cell interconnects 906. Conductive regions 1102 may include a gas diffusion layer, for example. A discontinuity region 908 may insulate and separate adjacent conductive regions 1102. A fuel plenum 1002 may be in contact with one or more of the conductive regions 1102, electrolyte 910, one or more cell interconnects 906 or a combination thereof. On an opposite side of the core assembly, an oxidant plenum 1104 may be in contact with one or more of the conductive regions 1102, electrolyte 910, one or more cell interconnects 906 or a combination thereof. A fuel may be hydrogen, for example, although any suitable fuel such as methanol, ammonia borane, hydrazine, ethanol, formic acid, butane, borohydride compounds etc. may be utilized. The oxidant may be air or oxygen, for example.

Conductive regions 1102 may include electrodes, such as anodes and cathodes. The anodes and cathodes may include catalyst layers or gas diffusion layers or both. The anodes and cathodes may be separated by an ion-exchange membrane. Cell interconnects 906 may contact the anodes and cathodes through the ion-exchange membrane, for example. The cell interconnects 906 may direct a current orthogonal to an array of electrochemical cells. The anodes and cathodes may be aligned or off-set, for example. The ion-exchange membrane or layer may overlay or substantially overlay a currently collecting area or currently collector.

The unit cells can be interconnected in various possible ways in which the unit cells in a small array. Individual unit cells can be connected in series or in parallel, as described in U.S. application Pub. No. 2005/0250004 entitled "ELECTROCHEMICAL CELLS HAVING CURRENT CARRYING STRUCTURES UNDERLYING ELECTROCHEMICAL REACTION LAYERS," referred to above.

The above description is intended to be illustrative, and not restrictive. For example, the above-described examples may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A coated electrolyte composite for a plurality of electrochemical cells in an array, comprising:
   a composite layer having a dielectric component and an electrically conductive component; and
   two or more conductive regions, each conductive region comprising a gas diffusion layer and a coating having one or more electrochemical reaction areas, one or more current collecting areas or a combination thereof;
   wherein the electrically conductive component is in contact with the coating and wherein adjacent conductive regions are positioned to provide a discontinuity region.

2. The coated electrolyte composite of claim 1, wherein the electrically conductive component comprises a cell interconnect.

3. The coated electrolyte composite of claim 1, wherein the dielectric component comprises an electrolyte.

4. The coated electrolyte composite of claim 1, wherein the dielectric component comprises a proton exchange membrane or a solid oxide electrolyte.

5. The coated electrolyte composite of claim 1, further comprising a dielectric material at least partially disposed on the cell interconnect and at least partially disposed on the dielectric component of the composite layer.

6. The coated electrolyte of claim 5, wherein the material is positioned to provide a discontinuity with any adjacent conductive regions along the material.

7. The coated electrolyte composite of claim 1, wherein the one or more current collecting areas and the one or more electrochemical reaction areas are discrete areas and are positioned to abut on the perimeters of each area.

8. The coated electrolyte composite of claim 1, wherein the coating comprises a catalyst layer.

9. The coated electrolyte composite of claim 1, wherein at least some of the one or more electrochemical reaction areas are in contact with the dielectric component.

10. The coated electrolyte composite of claim 1, wherein the discontinuity region exposes at least a portion of the dielectric component.

11. The coated electrolyte composite of claim 1, wherein a single cell interconnect is in contact with a first conductive region and isolated from a second conductive region, the second conductive region positioned adjacent to the first conductive region.

12. The coated electrolyte composite of claim 1, wherein one or more cell interconnects at least partially penetrate the surface of the composite layer.

13. The coated electrolyte composite of claim 1, wherein the composite layer comprises a first surface and a second surface, the second surface opposite the first.

14. The coated electrolyte composite of claim 13, wherein the two or more conductive regions are positioned on both the first surface and second surface.

15. The coated electrolyte composite of claim 14, wherein the two or more conductive regions on opposite surfaces are aligned.

16. A core assembly for an electrochemical cell, comprising:
two or more electrode assemblies, each assembly comprising:
one or more electrodes;
one or more cell interconnects; and
a dielectric material in contact with the one or more electrodes and the one or more cell interconnects;
wherein at least two like electrodes from adjacent electrode assemblies are positioned in a substantially planar array and positioned to provide an insular break between the two or more electrode assemblies, and wherein at least one of the electrodes includes a gas diffusion layer.

17. The core assembly of claim 16, wherein the one or more electrodes comprise one or more electrochemical reaction areas, one or more current collecting areas or a combination thereof.

18. The core assembly of claim 16, wherein the dielectric material comprises an ionically conductive material.

19. The core assembly of claim 17, wherein the one or more electrochemical reaction areas comprises a catalyst layer.

20. The core assembly of embodiment 17, wherein the one or more electrochemical reaction areas are in contact with the dielectric material.

21. The core assembly of claim 16, wherein the insular break exposes at least a portion of the dielectric material.

22. The core assembly of claim 17, wherein each of the one or more current collecting areas is in contact with at least one of the one or more cell interconnects.

23. The core assembly of claim 17, wherein a single cell interconnect is in contact with a first electrode and isolated from a second electrode, the second electrode positioned adjacently to the first electrode.

24. An electrochemical cell assembly, comprising:
two or more electrochemical cells positioned in an array, each cell comprising:
an anode electrode;
a cathode electrode;
an ion-exchange layer, positioned between the anode electrode and cathode electrode, wherein at least one of the anode electrode or the cathode electrode of each electrochemical cell includes a gas diffusion layer;
a cell interconnect, in contact with the anode electrode of a first electrochemical cell and the cathode of a second electrochemical cell, in which the first and second electrochemical cells are adjacently positioned in an array;
wherein like electrodes of adjacently positioned electrochemical cells are positioned to provide a discontinuity between the adjacent cells and wherein the like electrodes of adjacent cells are substantially in the same plane.

25. The electrochemical cell assembly of claim 24, wherein the electrochemical cells comprise fuel cells.

26. The electrochemical cell assembly of claim 24, wherein the electrochemical cells comprise Proton Exchange Membrane (PEM) fuel cells, solid oxide fuel cells, or alkaline fuel cells.

27. The electrochemical cell assembly of claim 24, wherein the array is substantially planar.

28. The electrochemical cell assembly of claim 24, wherein at least one of the anode electrode or cathode electrode comprises a catalyst layer.

29. The electrochemical cell assembly of claim 24, wherein the cell interconnect contacts the anode and cathode through the ion-exchange layer.

30. The electrochemical cell assembly of claim 24, wherein the cell interconnect directs a current orthogonal to the array.

31. The electrochemical cell assembly of claim 24, wherein the anode electrode is substantially aligned with the cathode electrode of each electrochemical cell.

32. The coated electrolyte composite of claim 1, wherein the gas diffusion layer is electrically conductive.

33. The core assembly of claim 16, wherein the gas diffusion layer is electrically conductive.

34. The electrochemical cell assembly of claim 24, wherein the gas diffusion layer is electrically conducive.

* * * * *

UNITED STATES PATENT AND TRADEMARK OFFICE
CERTIFICATE OF CORRECTION

| | | |
|---|---|---|
| PATENT NO. | : 8,129,065 B2 | Page 1 of 1 |
| APPLICATION NO. | : 12/341294 | |
| DATED | : March 6, 2012 | |
| INVENTOR(S) | : Jeremy Schrooten et al. | |

It is certified that error appears in the above-identified patent and that said Letters Patent is hereby corrected as shown below:

In column 11, line 1, in Claim 6, delete "electrolyte" and insert -- electrolyte composite --, therefor.

In column 11, line 54, in Claim 20, delete "embodiment" and insert -- claim --, therefor.

In column 12, line 54, in Claim 34, delete "conducive." and insert -- conductive. --, therefor.

Signed and Sealed this
Fourteenth Day of August, 2012

David J. Kappos
*Director of the United States Patent and Trademark Office*